(12) United States Patent
Soffer et al.

(10) Patent No.: US 9,767,049 B2
(45) Date of Patent: Sep. 19, 2017

(54) ISOLATED KVM COMBINER FOR MULTI-NETWORK COMPUTER SYSTEM HAVING A VIDEO PROCESSOR

(71) Applicant: HIGH SEC LABS LTD, Yokneam (IL)

(72) Inventors: Aviv Soffer, Caesarea (IL); Oleg Vaisband, Kiryat Yam (IL)

(73) Assignee: HIGH SEC LABS LTD., Yokneam (IL)

( * ) Notice: Subject to any disclaimer, the term of this patent is extended or adjusted under 35 U.S.C. 154(b) by 0 days.

(21) Appl. No.: 14/297,759

(22) Filed: Jun. 6, 2014

(65) Prior Publication Data

US 2014/0289433 A1 Sep. 25, 2014

Related U.S. Application Data

(63) Continuation of application No. 13/060,231, filed as application No. PCT/IL2009/000815 on Aug. 19, 2009, now Pat. No. 8,769,172.

(Continued)

(51) Int. Cl.
*G06F 13/12* (2006.01)
*G06F 13/10* (2006.01)
(Continued)

(52) U.S. Cl.
CPC ............ *G06F 13/105* (2013.01); *G06F 3/023* (2013.01); *G06F 13/00* (2013.01); *G06F 21/82* (2013.01);
(Continued)

(58) Field of Classification Search
None
See application file for complete search history.

(56) References Cited

U.S. PATENT DOCUMENTS 6,671,756 B1 12/2003 Thomas et al.
7,113,978 B2 9/2006 Beasley et al.
(Continued)

FOREIGN PATENT DOCUMENTS

WO 03/009118 A2 1/2003

OTHER PUBLICATIONS

"Peripheral Sharing Switch (PSS) for Human Interface Devices" Protection Profile; Sep. 7, 2010, NSA (NIAP) in www.niap-ccevs.org/pp/PP_PSSHID_V2.1.

(Continued)

*Primary Examiner* — Idriss N Alrobaye
*Assistant Examiner* — Richard B Franklin
(74) *Attorney, Agent, or Firm* — Browdy and Neimark, PLLC

(57) ABSTRACT

The present invention presents apparatuses and systems for operating multiple computers from a single keyboard and a single mouse and view composite videos generated from video output of the multiple computers on a single display, while preventing any possible information leakage between the computers. Keyboard and mouse commands detected by a host controller are used to control a video processor and a peripheral switch. The peripheral switch directs keyboard and mouse signals to one selected host and at the same time, the video processor creates an active display window showing video information from the selected host. Physical unidirectional isolators in the video, keyboard and mouse channels prevent any potential data leakages between hosts.

19 Claims, 16 Drawing Sheets

Related U.S. Application Data

(60) Provisional application No. 61/089,945, filed on Aug. 19, 2008.

(51) Int. Cl.

| | | |
|---|---|---|
| *G06F 3/023* | (2006.01) | |
| *G06F 21/83* | (2013.01) | |
| *G06F 21/84* | (2013.01) | |
| *G06F 13/00* | (2006.01) | |
| *G06F 21/82* | (2013.01) | |

(52) U.S. Cl.
 CPC .............. *G06F 21/83* (2013.01); *G06F 21/84* (2013.01); *G09G 2370/24* (2013.01)

(56) References Cited

U.S. PATENT DOCUMENTS

| | | |
|---|---|---|
| 7,240,111 B2 | 7/2007 | VanHarlingen et al. |
| 7,284,278 B2 | 10/2007 | Anson et al. |
| 7,568,029 B2 | 7/2009 | VanHarlingen et al. |
| 7,675,867 B1 | 3/2010 | Mraz et al. |
| 2002/0166067 A1 | 11/2002 | Pritchard et al. |
| 2004/0177264 A1 | 9/2004 | Anson et al. |
| 2004/0201765 A1 | 10/2004 | Gammenthaler |
| 2005/0015980 A1 | 1/2005 | Kottilingam et al. |
| 2005/0044266 A1 | 2/2005 | O'Neil |
| 2006/0230110 A1 | 10/2006 | VanHarlingen et al. |
| 2007/0033289 A1 | 2/2007 | Nuyttens et al. |
| 2007/0245165 A1 | 10/2007 | Fung |
| 2007/0260785 A1 | 11/2007 | Chen |
| 2008/0015087 A1 | 1/2008 | Negrin |
| 2008/0048975 A1 | 2/2008 | Leibow |
| 2008/0062121 A1 | 3/2008 | Huang et al. |
| 2008/0062632 A1 | 3/2008 | Liu |
| 2008/0081515 A1 | 4/2008 | Wu |
| 2008/0098307 A1* | 4/2008 | Corbefin ............... 715/733 |
| 2008/0163000 A1 | 7/2008 | McKim et al. |
| 2008/0198128 A1* | 8/2008 | Tsai et al. ............ 345/156 |
| 2010/0295859 A1 | 11/2010 | Stauffer et al. |
| 2012/0047281 A1* | 2/2012 | Lee et al. ............ 709/231 |

OTHER PUBLICATIONS

U.S. Government Approved Protection Profile—Validated Protection Profile-Peripheral Sharing Switch for Human Interface Devices Protection Profile, Version 2.1, NSA (NIAP) in www.niap-ccevs.org/pp/PP_PSSHID_V2.1.

CCEVS Approved Assurance Continuity Maintenance Report, Peripheral Sharing Switch (PSS) for Human Interface Devices; Sep. 7, 2010.

* cited by examiner

ISOLATED KVM COMBINER FOR MULTI-NETWORK COMPUTER SYSTEM HAVING A VIDEO PROCESSOR

CROSS-REFERENCE TO RELATED APPLICATIONS

The present patent application claims priority to the Provisional Application No. 61/089,945 of Aug. 19, 2008, as well as of the international application No. PCT/IL2009/00815 of Aug. 19, 2009 and is a Continuation Application of patent application Ser. No. 13/060,231. The entire content of these applications is incorporated herein by explicit reference for all purposes.

FIELD OF THE INVENTION

The present invention, in some embodiments thereof, relates to apparatuses and systems for operating multiple computers from a single set of peripheral devices. More particularly, the invention presents a special secure KVM device for interacting with computers using a single console, while preventing data leakage between the connected computers and attached networks.

BACKGROUND OF THE INVENTION

Existing devices such as a Keyboard Video Moose (KVM) switch are used for interconnecting a single computer to multiple computers for control purposes. The switch enables sending commands and getting information from the controlled computers, thus a user of a KVM may have remote access to multiple computers from a single keyboard, a monitor, and a mouse. During access, keyboard characters or pointing data are sent to the remote computers and video signals are routed via the switch from the remote computers, processed, and displayed on the single video monitor. In general, the user navigates through an on-screen menu or display for easy of switching between the controlled computers.

Some KVM switches allow a user to view and access one of the controlled computers, while at the same time, the user can view video images from the others non-accessed computers on some parts of his video screen. This provides simultaneous information to the user and enables fast and simple on-screen navigation between the controlled computers.

Prior art for available products that allow a user to view video images from multiple sources simultaneously on a single screen, include the QuadView™ XL, and the device described in "Apparatus and system for managing multiple computers", to VanHarlingen, Brian, Leibow, Michael, Chen and Li-ter, U.S. publication Ser. No. 11/105,063 US Now U.S. Pat. No. 7,240,111; but these products do not protect the information passed through the combiner device and leakage between the controlled computers is made possible on the KVM switch even if the controlled computers are far apart.

Previous systems presenting a KVN include United States Patent Application Number 2006/0230110A1, titled "Apparatus and system for managing multiple computers" to Brian VanHarlingen, Michael Leibow, and Li-ter Chen. However, they describe a non-secured KVM wherein the managed computers are not isolated and no isolation means presented.

OTHER REFERENCED PATENTS AND APPLICATIONS

1. United States Patent Application 20050044266—High isolation KVM switch
2. United States Patent Application 20040015980—Systems and methods for monitoring and controlling multiple computers
3. U.S. Pat. No. 7,240,111—Apparatus and system for managing multiple computers
4. U.S. Pat. No. 7,284,278—Secured KVM switch
5. U.S. Pat. No. 7,568,029—Apparatus and system for managing multiple computers
6. U.S. Pat. No. 7,113,978—Computer interconnection system For many applications (such as transactions in banking markets) it is desirable to have a secured management device that, on one hand allows for simple interaction and control of multiple computers, yet, on the other hand, prevents information leakage between the controlled computers.

The present invention addresses this aspect of isolation in a combiner, thus providing higher level of security.

SUMMARY OF THE INVENTION

It is provided in accordance with one embodiment, an Isolated KVM combiner for multi-network computer system comprising:
  a keyboard input configured to connect to a keyboard;
  a pointing device input configured to connect to a pointing device;
  a host controller receiving signals from at least one of said keyboard and said pointing device;
  at least one first peripheral interface and at least one second peripheral interface configured to connect to at least one first host computer and at least one second host computer, respectively;
  a peripheral switch selectively directing signals from said host controller only to a selected one of said at least one first peripheral interface and said at least one second peripheral interface at a time;
  at least one first physical unidirectional enforcing circuitry and at least one second physical unidirectional enforcing circuitry connected between said peripheral switch and said at least one first peripheral interface and said at least one second peripheral interface, respectively, enforcing data flow only from said peripheral switch to the peripheral interfaces;
  at least one first video input interface and at least one second video input interface configured to connect to video outputs of said at least one first host computer and said at least one second host computer, respectively;
  at least one video output port configured to connect to a user display device;
  a video processor;
  at least one first video physical unidirectional isolator and at least one second video physical unidirectional isolators, each connected between said video processor and one of said at least one first video input interface and said at least one second video input interfaces, respectively, enforcing data flow only from said at least one first video input interface and said at least one second video input interface, respectively, to said video processor,
  wherein said video processor is capable of combining video signals from the at least one first video input interface and the at least one second video input interface to a composite video signal and outputting said composite video signal to said at least one video output port, and wherein said video processor is responsive to commands received from at least one of said keyboard input and said pointing device input.

In accordance with another embodiment, the at least one first host computer and the at least one second host computer are connected to at least two separate networks, respectively.

In accordance with another embodiment, said peripheral switch is responsive to commands received from at least one of said keyboard input and said pointing device input.

In accordance with another embodiment, said composite video signal to be displayed on the user display device comprises at least one first window and at least one second window, wherein video content of said at least one first window is derived from video signal from said at least one first video input interfaces, and video content of said at least one second window is derived from video signal from said at least one second video input interfaces.

In accordance with another embodiment, only one of said at least one first window and said at least one second window is an active window, and the video content of said active window is derived from video signal from video input interface of the host computer coupled to the peripheral interface selected by said peripheral switch.

In accordance with another embodiment, the Isolated KVM combiner further comprising a video frame buffer connected to said video processor.

In accordance with another embodiment, having at least one video input interface connected to an external video source other than a computer.

In accordance with another embodiment, the isolated KVM combiner further comprising at least one first non-volatile memory and at least one second non-volatile memory connected to said at least one first video input interface and at least one second video input interface, respectively, wherein said at least one first non-volatile memory and said at least one second non-volatile memory contain display parameters readable by said at least one first host computer and said at least one second host computer, respectively.

In accordance with another embodiment, said display parameters are readable to the respective host to emulate standard display DDC (Display Data Channel).

In accordance with another embodiment, upon connection of the isolated KVM combiner to one or more of the first or second host computers, the host computer video circuitry interrogates said at least one first non-volatile memory and said at least one second non-volatile memory to receive Plug & Play parameters.

In accordance with another embodiment, said Plug & Play parameters are selected from the group consisting: display name, supported display resolution, and supported display refresh rate.

In accordance with another embodiment, said at least one first non-volatile memory and said at least one second non-volatile memory are user programmable.

In accordance with another embodiment, the isolated KVM combiner further comprising:
- at least one first audio interface and at least one second audio interface, respectively connected to one of said at least one first host computer and at least one second host computer; and
- an audio multiplexer is connected to said at least one first audio interface and said at least one second audio interface and to at least one audio peripheral selected from a group consisting of: microphone, headset, and a speaker.

In accordance with another embodiment, the isolated KVM combiner further comprising a cascading port to enable the isolated KVM device to be cascaded to another isolated KVM device.

In accordance with another embodiment, said video processor comprises an FPGA (Field Programmable Gate Array).

In accordance with another embodiment, said video physical unidirectional isolators comprise a 1-Way DVI Interface.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE DRAWINGS

Figure 1:
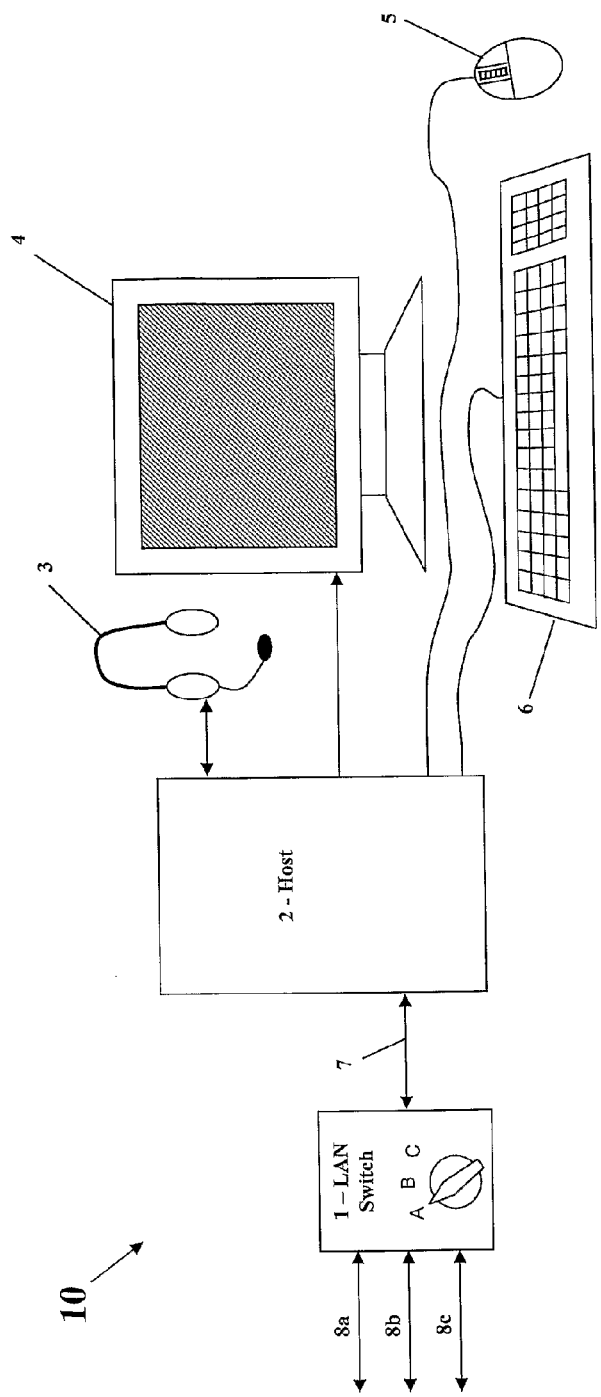
FIG. 1 illustrates a high-level block-diagram of a prior art system that enables a computer user to access multiple isolated networks using a single host computer.

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

FIG. 1 illustrates a high-level block-diagram of a prior art system 10 that enables a computer user to access multiple isolated networks using a single host computer. Host Computer 2 may be a PC, workstation, thin-client or portable computer connected to a single set of user mouse 5, user keyboard 6, user display 4 and user headset 3. Host Computer 2 connected to three separate networks 8a, 8b and 8c via LAN (Local Area Network) cable 7 and LAN switch 1. LAN switch 1 may be a simple mechanical switch controlled by the user to enable access to the three LAN ports 8a, 8b, and 8c. As the three networks may have different security levels it is typically desirable that LAN switch 1 will be designed in such way that it will reduce the risk electrical leakage between the three connected networks.

One major drawback of this method is that the connected of different security level networks to a single host 2 and its network adapter presenting the risk of leakage between the networks in the host. This can be done by hardware or by software means and although both networks are not connected simultaneously to the host 2, information leaks may happen after LAN switch 1 connecting the host 2 to a different network. Another drawback of this system is the need to reboot the host 2 after switching network. Even with this practice data may leak between networks through the single attached host 2.

Another disadvantage of this prior-art system is that the user cannot work simultaneously at application from different networks. This switching between application and networks is though for users that needs to work on different networks on a daily basis.

Figure 2:
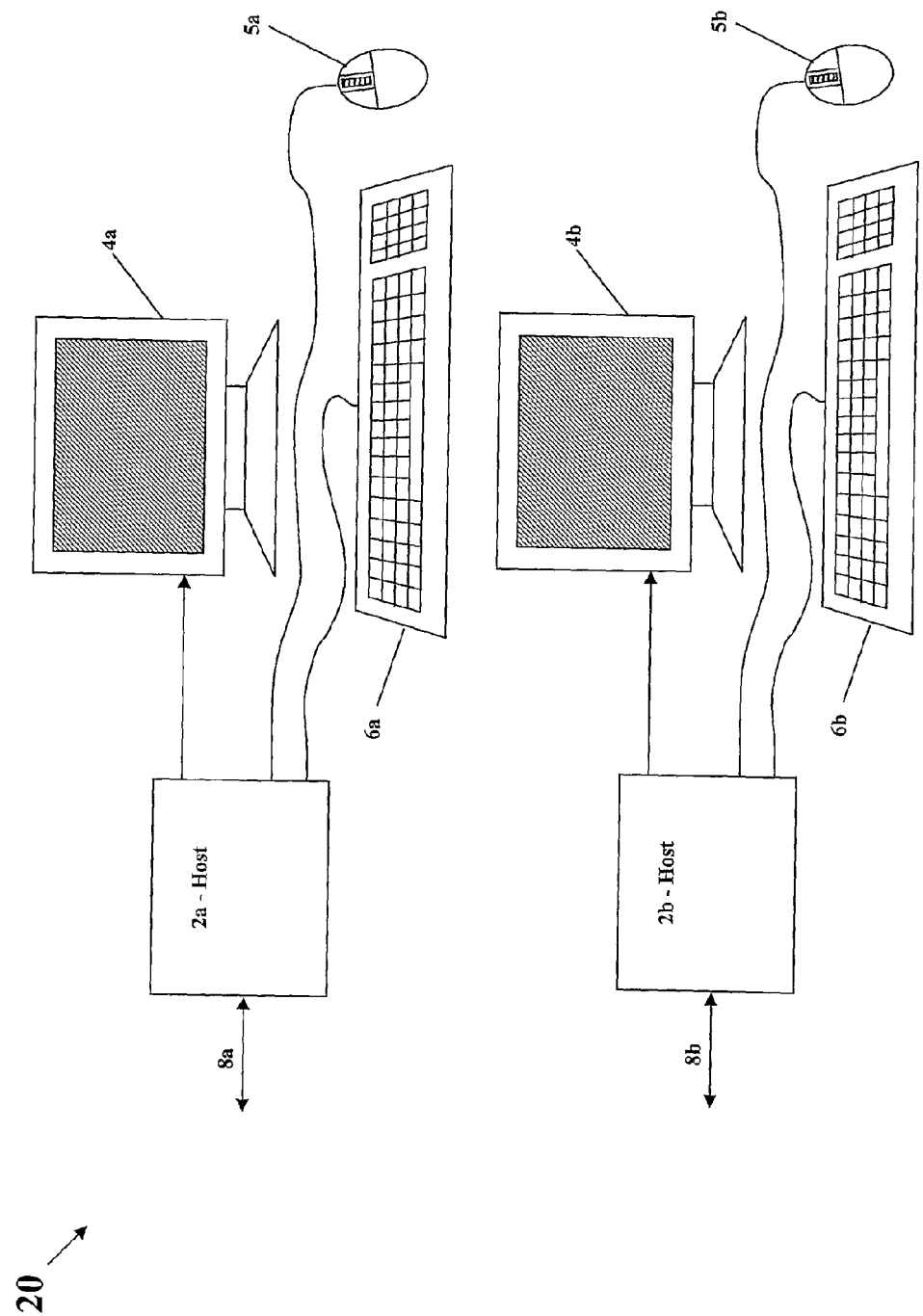
FIG. 2 illustrates a high-level block-diagram of yet another prior art system that enables a computer user to access multiple networks using multiple host computers.

FIG. 2 illustrates a high-level block-diagram of yet another prior art system 20 that enables a computer user to access multiple networks using multiple host computers. In this system the user uses two sets of computer hosts 2a and 2b, connected to two separate networks 8a and 8b accordingly. Computer hosts 2a and 2b also connected to two sets of desktop interaction devices—user keyboards 6a and 6b, user mice 5a and 5b and two user displays 4a and 4b.

While this system eliminates the risk of leakage between the two networks 8a and 8b, it has several disadvantages.

One disadvantage of this system is that the user needs to interact with two separate sets of keyboards mice and displays. This divided focus tends to confuse the user.

Another disadvantage is the desktop space needed and the added costs of the two separate sets.

Figure 3:
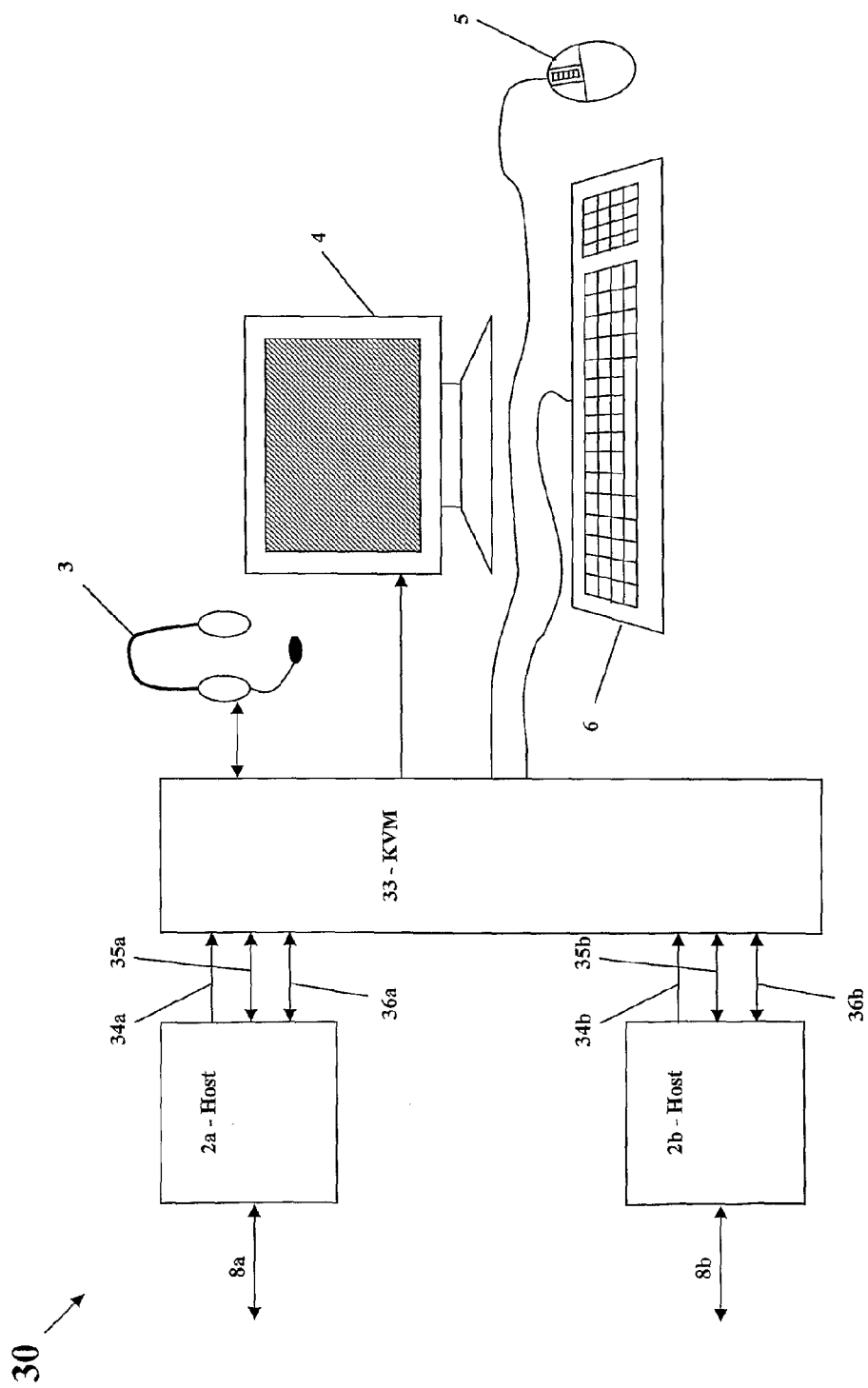
FIG. 3 illustrates a high-level block-diagram of yet another prior art system that enables a computer user to access multiple networks using multiple host computers and legacy KVM (Keyboard Video Mouse) device.

FIG. 3 illustrates a high-level block-diagram of another prior art system 30 that enables a computer user to access multiple networks using multiple host computers and legacy KVM (Keyboard Video Mouse) device. In this system Host Computers 2a and 2b may be PC, workstation, thin-client or portable computer. Host computers 2a and 2b are connected to isolated networks 8a and 8b respectively.

Host computers 2a and 2b are connected to a KVM device 33 through a set of connection cables. Cables 34a and 34b delivers the video output of Host computers to the KVM. Cables 35a and 35b connects the peripheral interface of Host computers to the KVM. Peripheral interface may be PS/2 (IBM Personal System 2 standard), USB (Universal Serial Bus) or other peripheral protocol. Cables 36a and 36b connects the audio input/output of Host computers to the KVM. KVM device 33 switches the Host computer inputs/outputs to the connected set of Human Interface devices comprising of a display 4, mouse 5, keyboard 6 and headset or speakers 3. Switch over from Host computer 2a to 2b and back is controlled by the user through special keyboard keys combination or by activation a switch located at the KVM 33.

While this system has the advantage of reduced LAN leakage through the Host computers, it can still enable data leakage at the KVM 33 due to software or hardware vulnerabilities.

Another disadvantage of this system is that the user must switch completely from one environment to the other. Some legacy KVMs designed to provide electrical isolation between the host computers to reduce the risk of electrical and electromagnetic leakages between the isolated LANs.

Figure 4:
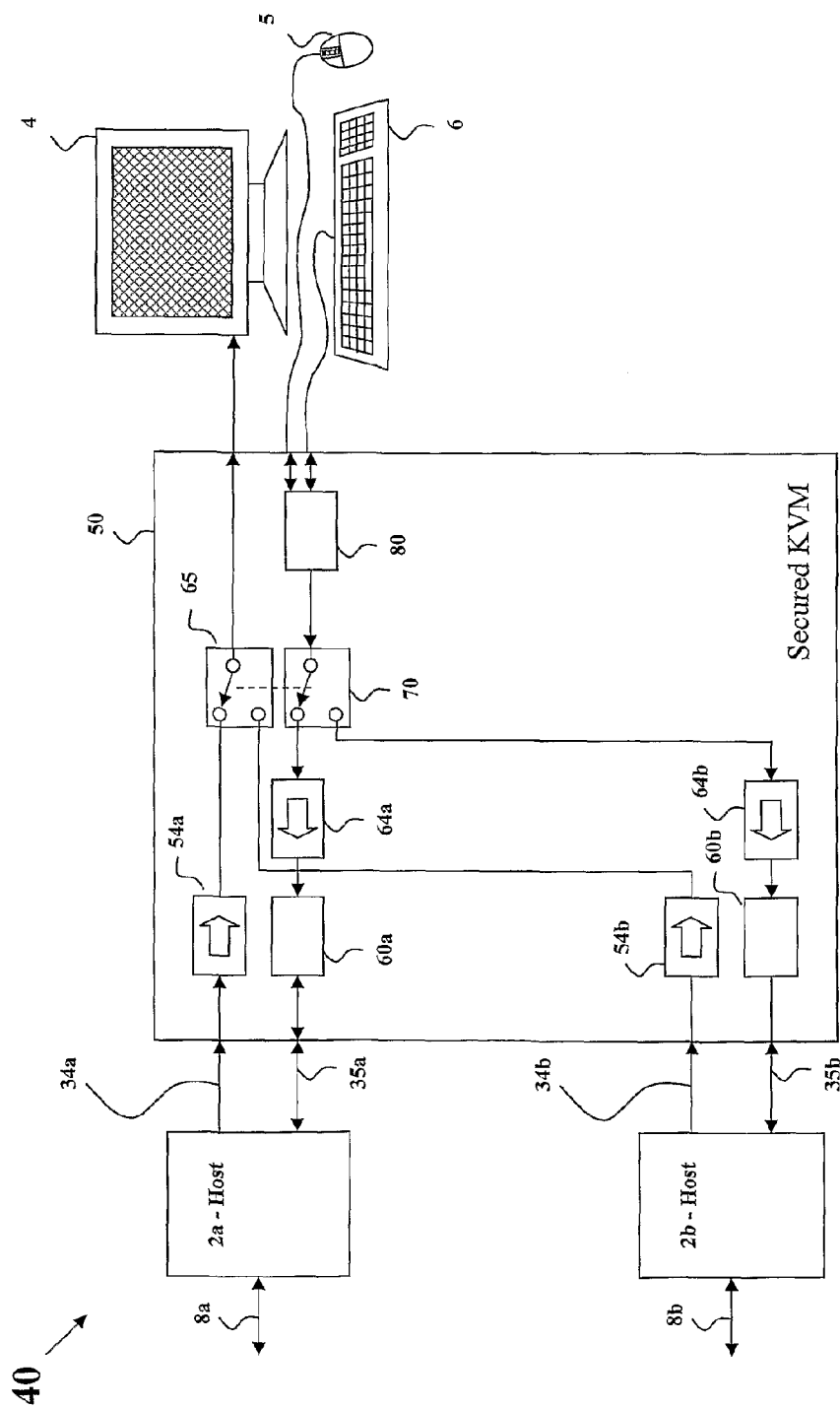
FIG. 4 illustrates a high-level block-diagram of a preferred embodiment of the present invention that enables a computer user to safely access multiple isolated networks using multiple host computers and a secured KVM device.

FIG. 4 illustrates a high-level block-diagram of a preferred embodiment of the present invention 40 that enables a computer user to safely access multiple isolated networks using multiple host computers and a Secured KVM device. In this system Host Computers 2a and 2b may be PC, workstation, thin-client or portable computer. Host computers 2a and 2b are connected to isolated networks 8a and 8b respectively. It should be noted here that Secured KVM device may have many more ports to support additional Host Computers. To simplify the figures, only two channels are shown hereafter.

Host computers 2a and 2b are connected to a Secured KVM device 50 through a set of connection cables. Cables may be substituted by other connection means such as fiber-optical links or wireless connection. Cables 34a and 34b delivers the video output of Host computers to the Secured KVM device 50. Cables 35a and 35b connects the peripheral interface of Host Computers 2a and 2b to the Secured KVM 50. Peripheral interface may be PS/2 (IBM Personal System 2 standard), USB (Universal Serial Bus) or any other suitable peripheral protocol.

Secured KVM device 50 Host Computer 2a video inputs connected to an optional physical isolator 54a. Physical isolator may be opto-isolator, serial link, electromagnetic coupler, transformer or any other suitable circuitry. Similarly Host Computer 2b video input is connected to an optional physical isolator 54b. Isolation may be needed to avoid signal leakage between host computers due to common ground or power. If Host video input is analog additional buffer amplifier circuitry may be needed to properly interface with analog video source. If Host video input is digital (such as DVI) additional receiver circuitry may be needed to properly interface with digital video source.

Physical isolators 54a and 54b are connected to the video switch 65 to select active channel visible to the user through video output and User Display device 4.

Physical isolators 54a and 54b may have built-in or separate Analog to Digital converter (ADC) to enable interfacing with analog video signals from Host Computers 2a and 2b.

Secured KVM device 50 Host Computer 2a peripheral port 35a is connected to peripheral emulator circuitry 60a. Secured KVM device 50 Host Computer 2b peripheral port 35b is connected to peripheral emulator circuitry 60b. Peripheral Emulators circuitry 60a and 60b emulating standard peripheral device such as USB or PS/2 keyboard or mouse. Peripheral Emulators circuitry 60a and 60b are connected to physical unidirectional enforcing circuitry 64a and 64b respectively. Physical unidirectional enforcing circuitry 64a and 64b are for example: opto-isolator, serial link, electromagnetic coupler, transformer or any other suitable circuitry assuring one directional flow of data. Physical unidirectional enforcing circuitry 64a and 64b are required in order to assure that in any case of software failure or intended sabotage in the Host Computers 2a and 2b or in the Secured KVM device 50, peripheral interface cannot cause information leakage between host computers.

Physical unidirectional enforcing circuitry 64a and 64b are connected to peripheral switch 70 to select active peripheral channel connected to the user keyboard and mouse.

Host controller 80 connected to the peripheral switch 70 interfaces between the bidirectional data flow of the connected user peripherals (mouse 5 and keyboard 6) and the physically forced unidirectional data flow to the said peripheral emulators 60a and 60b.

Since peripheral protocols are bi-directional in nature and the data path between the host controller 80 and the peripheral emulators 60a and 60b is forced to unidirectional flow, the host controller serves as an interface between the standard peripheral protocol (such as PS/2 or USB) and the non-standard unidirectional internal protocol. This internal protocol may use one way serial, I2C or any other standard or non standard interface.

Video switch 65 and peripheral switch 70 can be manually operated by the user by means of mechanical switch. Video switch 65 and peripheral switch 70 can be alternatively controlled by host controller function 80 to switch sources based on preprogrammed keyboard keys combination or mouse control.

Figure 5:
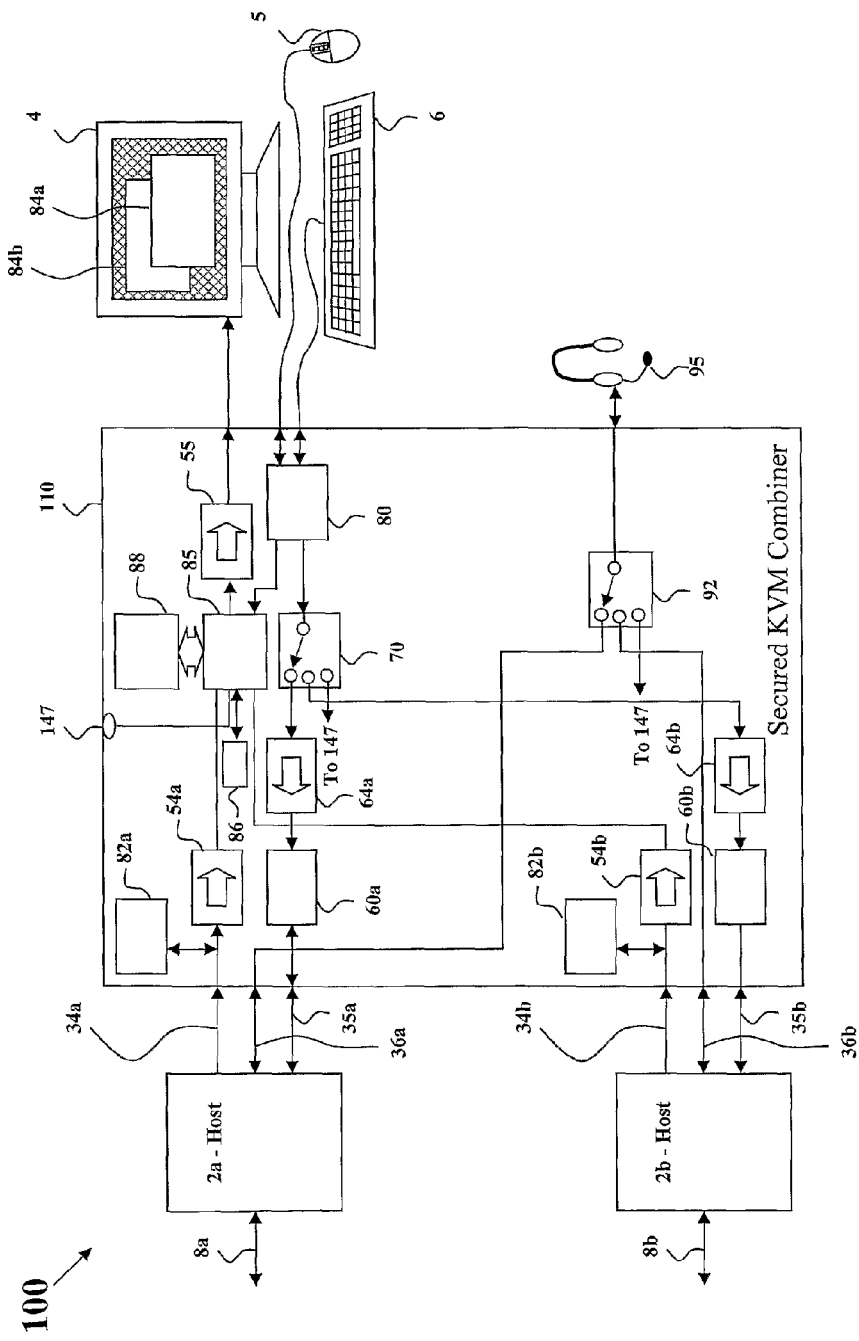
FIG. 5 illustrates a high-level block-diagram of another preferred embodiment of the present invention having secured KVM combiner function.

FIG. 5 illustrates a high-level block-diagram of a preferred embodiment of the present invention 100 similar to the previous FIG. 4 having Secured KVM Combiner function 110. In this preferred embodiment of the present invention the video switch function 65 of the previous FIG. 4 replaced by video processing function 85. This video processing function receives multiple digital video data from optional physical isolators 54a and 54b to generate windows 84a and 84b (respectively) on output video port. To enable asynchronous video input and to enable additional video function an optional volatile memory 88 serving as video frame buffer connected to the video processing function 85. Volatile memory 88 may be DRAM, DDR or any suitable fast volatile memory type.

Video processing function 85 may optionally be comprised of discrete logic, CPU, FPGA or ASIC technology.

Video processing function 85 receives commands from host controller function 80 based on user mouse and keyboard input. The host controller function 80 calculates mouse location in system mode, keys status, windows sizes, priority and locations and all other machine states and send proper commands to the video processing function 85 directly or through optional unidirectional flow device. User specific settings and administrator settings are all stored in the host controller function 80 non-volatile memory.

Video processing function 85 can receive video data from hosts that are not at the same display setting (resolution, refresh rate, colors, and phase) and stores it temporarily on the volatile memory frame-buffer 88. Video output is generated by reading the volatile memory frame-buffer 88 content at any needed rate. Output display resolution can be adapted to any desirable setting irrespective to video input settings. Video processor may have a non-volatile memory device 86 to store CPU, FPGA or ASIC program and optional customer specific graphics such as display background images. Video processing function 85 typically connected to the user display 4 through DVI or HDMI transmitter 55 acting as a unidirectional flow device. This DVI or HDMI transmitter converts the digital video stream to differential signals needed to drive standard displays.

Non-volatile memory 82a and 82b connected to the Host Computers 2a and 2b respectively. Non-volatile memory may contain display parameters readable to the host to emulate standard display DDC (Display Data Channel). Upon connection of Secured KVM Combiner to the Host Computers 2a and 2b, Host computers video circuitry interrogates the non-volatile memory functions 82a and 82b to receive Plug & Play parameters such as display name, supported display resolution, supported display refresh rate etc. Non-volatile memory functions 82a and 82b may be programmed by the user to provide adequate information to the Host Computers as needed.

As video input data may have higher combined bandwidth than memory and video processing bandwidth various methods may be used to reduce such bandwidth.

Cropping of input video data removes data of areas that are not visible on the user display at any particular moment Frame dropping—reduces incoming video data by skipping some frame. This method may cause visible artifacts though.

Reduced color depth or color depth conversion reduces input data at the cost of reduced color representation.

Other methods may be used to avoid bandwidth limitations depending on required video input settings.

An optional audio switching or mixing may be added to the Secured KVM Combiner device 110 in order to enable user to operate audio peripherals such as microphone, headset 95 or speakers. Host Computers 2a and 2b having additional audio cables 36a and 36b connected to the Secured KVM Combiner apparatus. Cables may be audio out, audio in, microphone or any other digital or analog audio signal. Audio multiplexer/mixer 92 enables volume control of selected/unselected hosts based on programmed settings. For example selected host audio channel may have higher volume compared to other host audio signals. In some exemplary embodiments, audio signals comprises of speaker signals transmitted to the user speaker, but no microphone signals. By allowing only speaker signals, unidirectional signal flow is ensured.

Cascading port 147 connected to the video processor 85 and optionally connected to host controller 80, enable parallel connection of more than one Secured KVM Combiner devices to increase the number of Host Computer ports. To support cascading of peripherals and audio, switches 70 and 92 may have an additional (third in the depicted exemplary embodiment) position to enable access of external cascaded Secured KVM Combiner to the attached set of headset 95, keyboard 6 and mouse 5. In order to coordinate cursor location and system states, host emulator function 80 may be also connected to the cascading port 147.

Figure 6A:
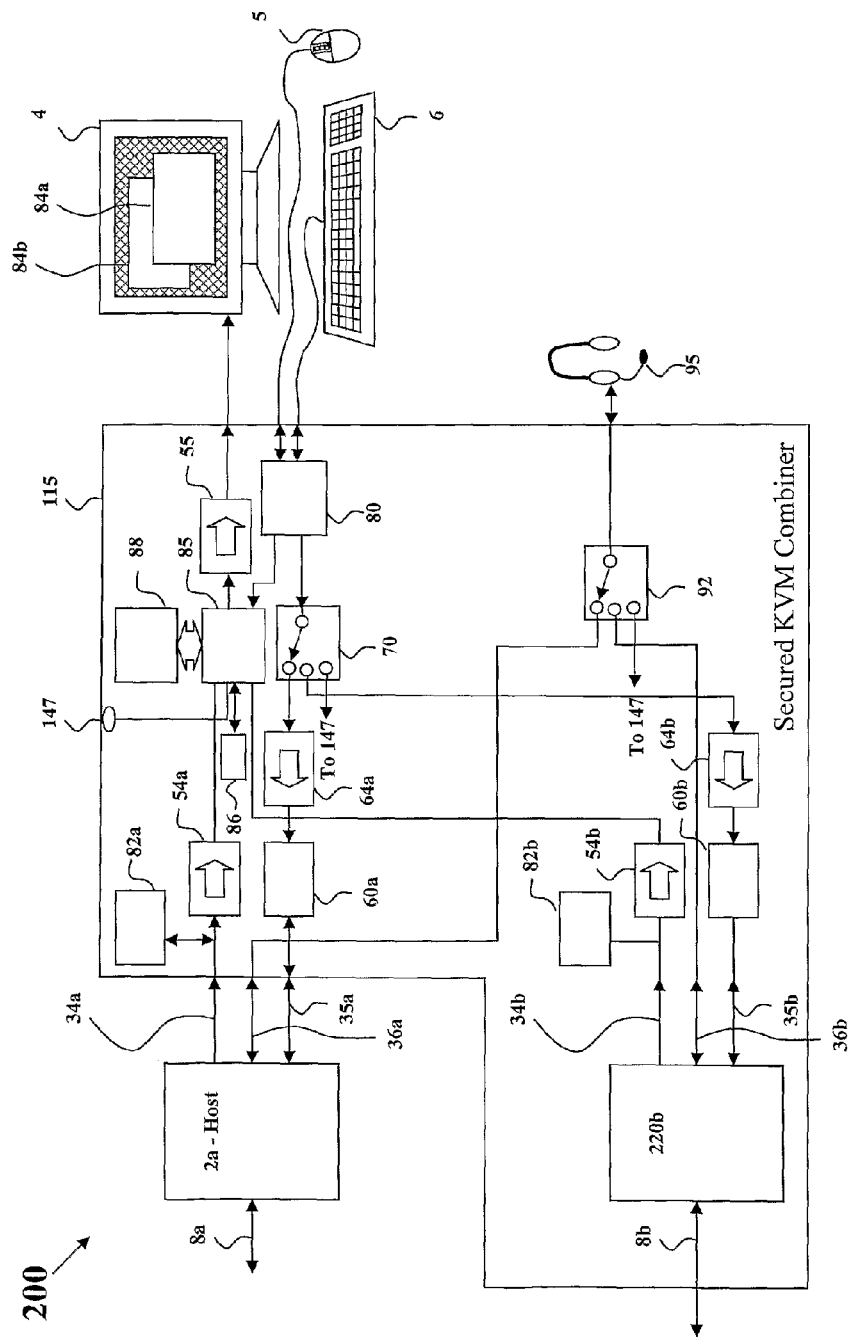
FIG. 6a illustrates a typical implementation of a secured KVM combiner of another preferred embodiment of the present invention.

FIG. 6a illustrates a typical implementation of a Secured KVM Combiner 115 similar to the Secured KVM Combiner 110 of the previous FIG. 5. In this system 200, second host 2b is replaced by an internal thin-client/computer module 220b. This thin-client module internally connected to other Secured KVM Combiner functions through peripheral interface 35b, video interface 34b and audio interface 36b. Thin-client/computer module connected to its local area network 8b through a LAN jack or fiber interface installed on the device panel. Other controls and indications may be installed to support the thin-client/computer module 220b, such as Power/Fail LED, Reset switch and direct USB port to support local peripherals such as printers and authentication devices.

Figure 6B:
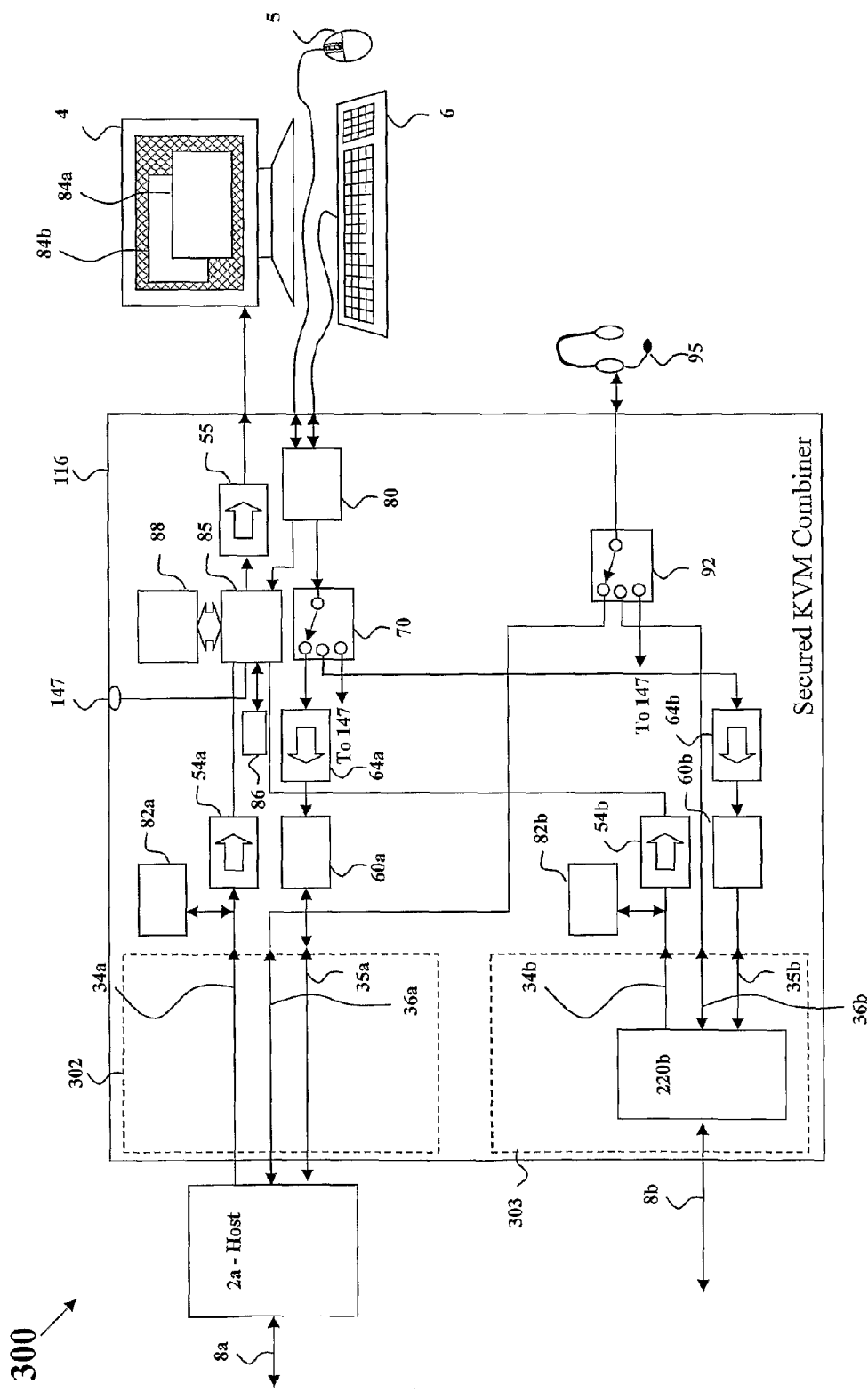
FIG. 6b illustrates yet another typical implementation of a Secured KVM Combiner, similar to the Secured KVM Combiner of the previous figure but with removable modules according to an exemplary embodiment of the present invention.

FIG. 6b illustrates yet another typical implementation of a Secured KVM Combiner 116 similar to the Secured KVM Combiner 115 of the previous FIG. 6a but with removable modules. In this system 300, the Secured KVM combiner 116 is designed as a modular chassis with several identical bays. Bays have electrical interfaces to enable insertion of required modules (302 and 303 in this example). Module 302 is auxiliary interconnection module to interface external host 2a. This module passes through or converts the peripheral interface 35b, video interface 34b and audio interface 36b from attached host 2a. Second module 303 is a thin-client/computer module with internal thin-client/computer 220b attached to external LAN 8b. This modular arrangement enables easy adaptation to the user and the organization with selection of internal or external hosts all interchangeable in a single chassis. Power to the module may be provided by KVM chassis 116 directly or through isolated supply or may be provided by external sources as required.

Figure 7:
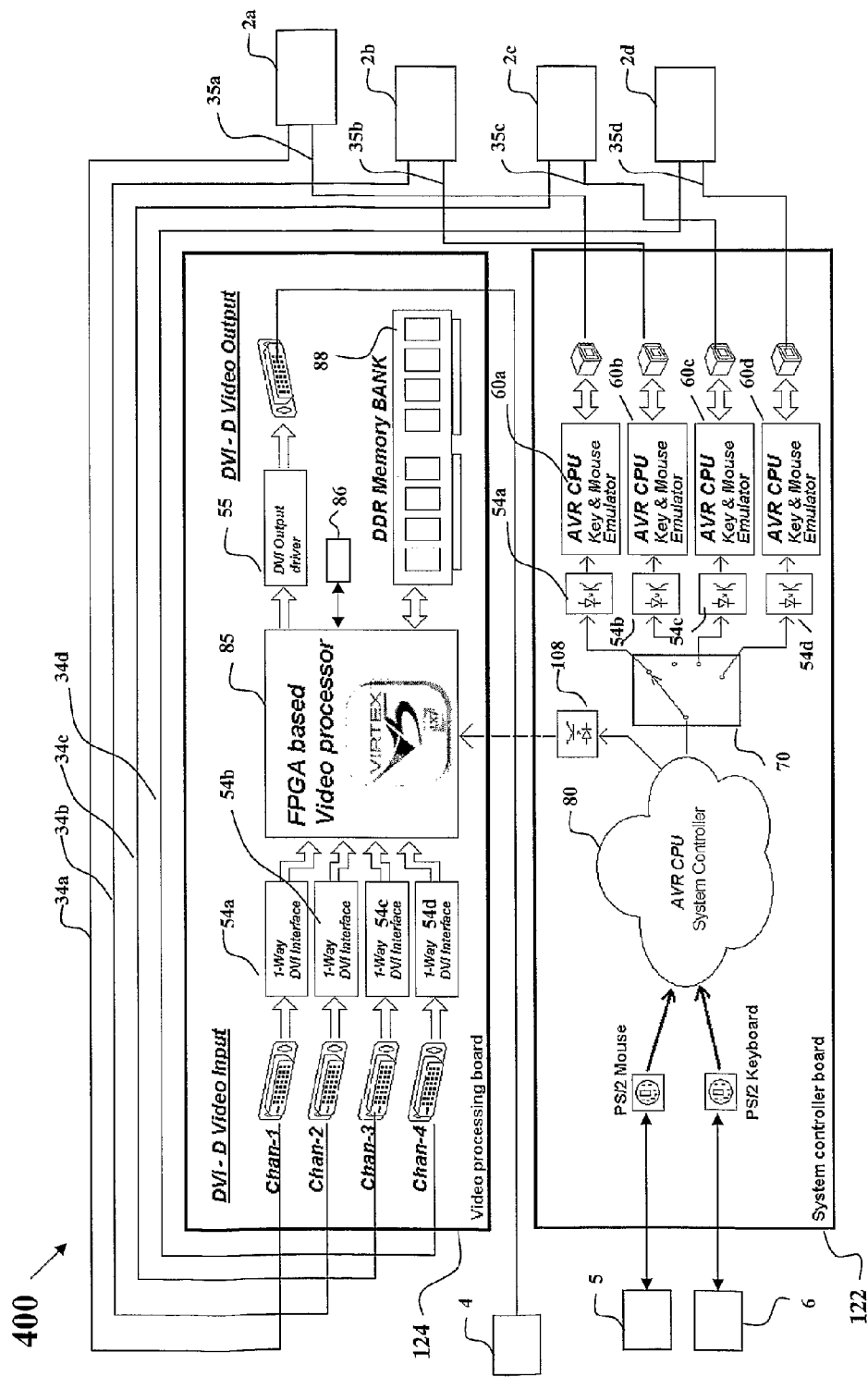
FIG. 7 illustrates a typical implementation of a secured KVM combiner of yet another preferred embodiment of the present invention wherein implementation of the design is separated into two separate boards—video processing board and system controller board.

FIG. 7 illustrates an exemplary implementation of a Secured KVM Combiner 400. In this implementation the design is separated into two separate boards—video processing board 124 and system controller board 122. To enhance product security the only link between system controller board 122 and video processor board 124 is a physical unidirectional enforcing circuitry 108 that connects the host controller 80 and the video processor 80 to deliver video commands and settings such as windows location, size, menu items, frames etc. 1-Way DVI interfaces 54a, 54b, 54c and 54d serves as a receiver (interface) between the differential DVI video in connected to the Host Computers video cards and a parallel (LCD bus) interface connected to the video processor 85. Each DVI Receiver 54a to 54d also serves as a physical unidirectional enforcing circuitry. In case that electrical isolation between video inputs is needed, additional isolators are placed between the DVI receivers and the video processor (not shown here). DVI Receivers 54a to 54d may also powered independently by isolated power supplies to avoid common ground plane. DVI Receivers 54a to 54d may also have separate electromagnetic shielding to avoid radiation leakage between channels.

In this particular implementation 4 channels are shown, however larger or smaller number of channels may be used.

For simplicity, cascading options are not depicted in this figure

Figure 8A:
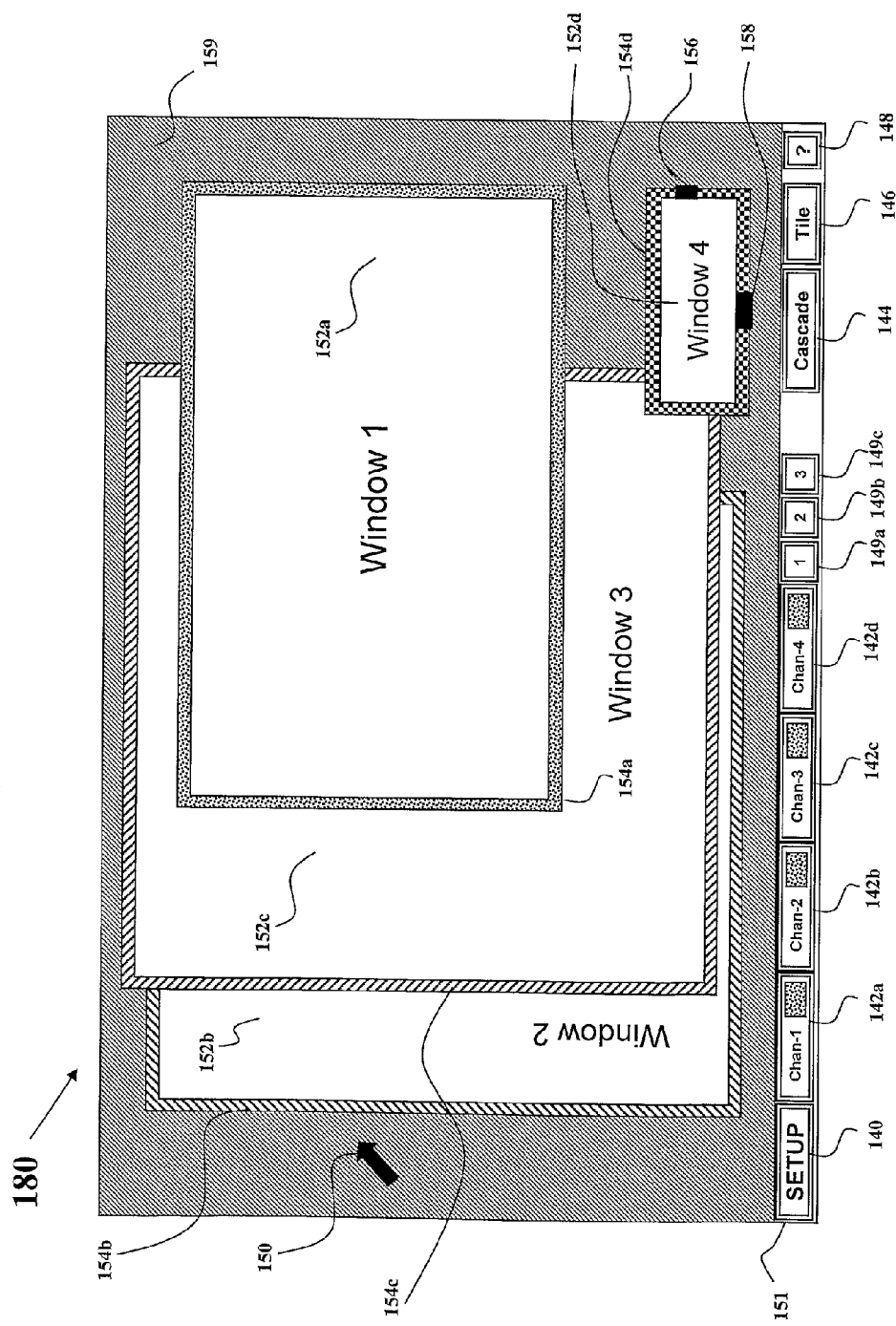
FIG. 8a illustrates a typical implementation of secured KVM combiner user display, in system mode, according to a preferred embodiment of the present invention.

FIG. 8a illustrates an exemplary implementation of a Secured KVM Combiner user display 180 in system mode. In the display mode shown, the user may move between different windows and change window size by using a pointing device and special system cursor 150. Task-bar 151 located at the bottom of the visible display presents push buttons for each of the 4 different sources. Channel 1 source is accessed by clicking on channel 1 key 142a. Channel 2 source is accessed by clicking on channel 2 key 142b, etc. Each channel key is preferably marked with the color selected for that source—for example channel 1 key is marked with colored box identical in color to the frame 154a generated by the video processor around window 152a. User may optionally cancel (disable) unused channel as will be explained in next FIG. 8b. Optionally, user may also use the wheel in wheel mouse device to toggle between the 4 channels and bring each window to the front. The optional setup key 140 in the task-bar 151 enable authorized administrator user to access setup screens. Access to the setup preferably requires authentication means such as front panel key-lock opening, user name and password, smart-card etc.

The background image 159 may be a programmed color or a custom bitmap stored at the Secured KVM Combiner in special non-volatile memory (see FIG. 5 item marked 86).

Preferably, user can use system cursor 150 to drag windows, and change window size by dragging window corner or side frame.

The task-bar may optionally roll down or disappear to save desktop space if mode is changed from system to normal.

User preset keys marked as 149a, 149b and 149c enable user to program specific windows arrangement and store it in one of the keys (this is done foe example by clicking on the preset key and holding for few seconds). Once user settings were stored, clicking on the key will immediately reconfigure the display with the stored setting.

Optional cascade key 144 located in the task-bar 151 change display mode to multiple overlaid windows. The optional tile key 146 arranges all 4 channels side by side to show all channels simultaneously.

Optional help key 148 located in the task-bar 151 may provide help images and text to assist the user in initial operation an in training.

In this example channel 4 window 152d reduced to a size smaller than its native resolution. As a result a vertical scroll-bar 156 and horizontal scroll-bar 158 appeared on the window frame 154d to enable user control of visible area.

Change from system mode to normal mode and back is preferably done through mouse clicks or other preprogrammed triggers. Once in normal mode, the system cursor disappears and the active host window cursor will be coupled to the user mouse.

Figure 8B:
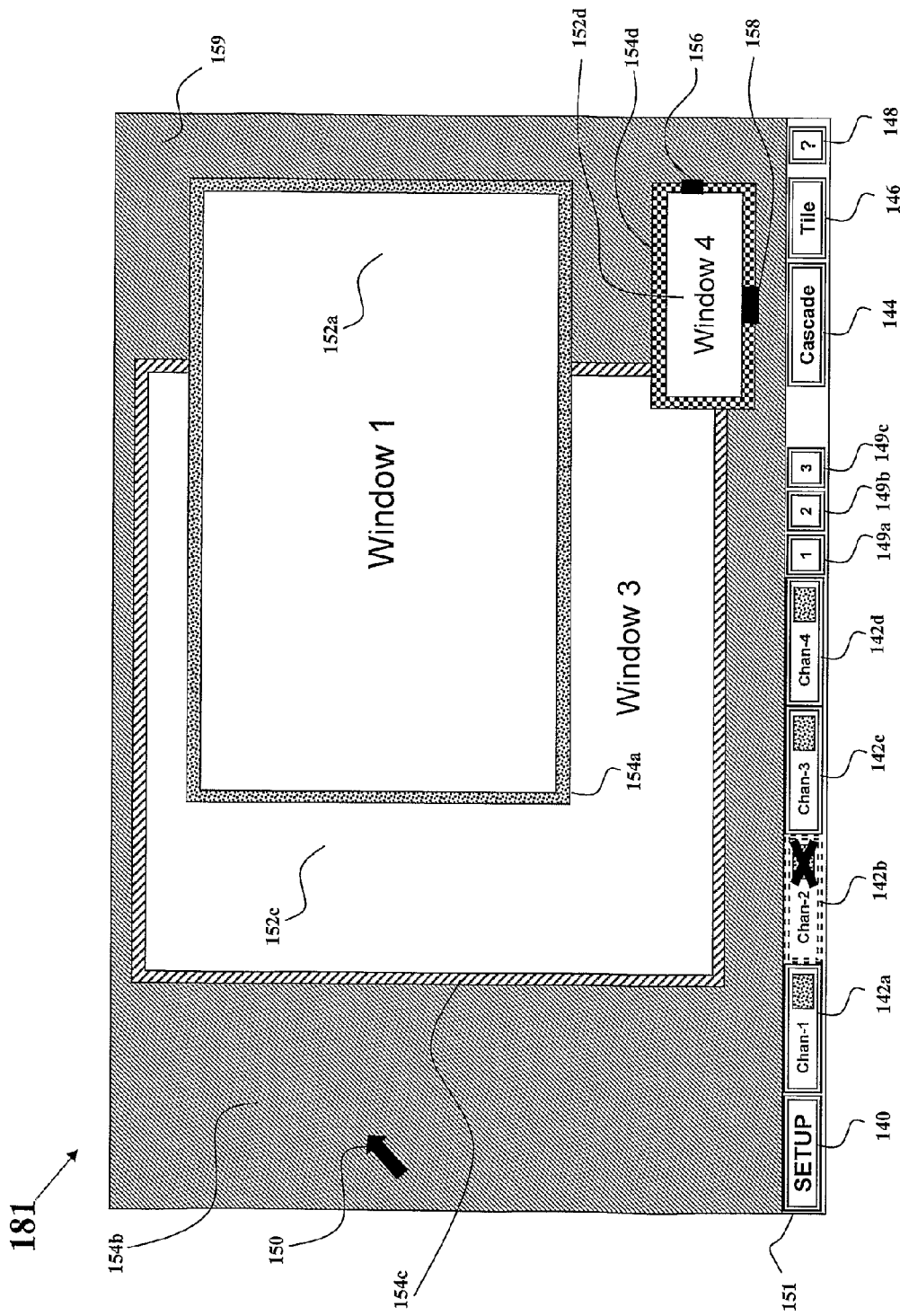
FIG. 8b illustrates another typical implementation of secured KVM combiner user display, in system mode wherein one window was disabled according to another exemplary embodiment of the present invention.

FIG. 8b illustrates the same display of FIG. 8 but with channel 2 disabled by the user. Windows 2 marked 152b of FIG. 8 is not shown anymore and channel 2 key in the task-bar 142b became gray and has a cross on it.

Figure 9:
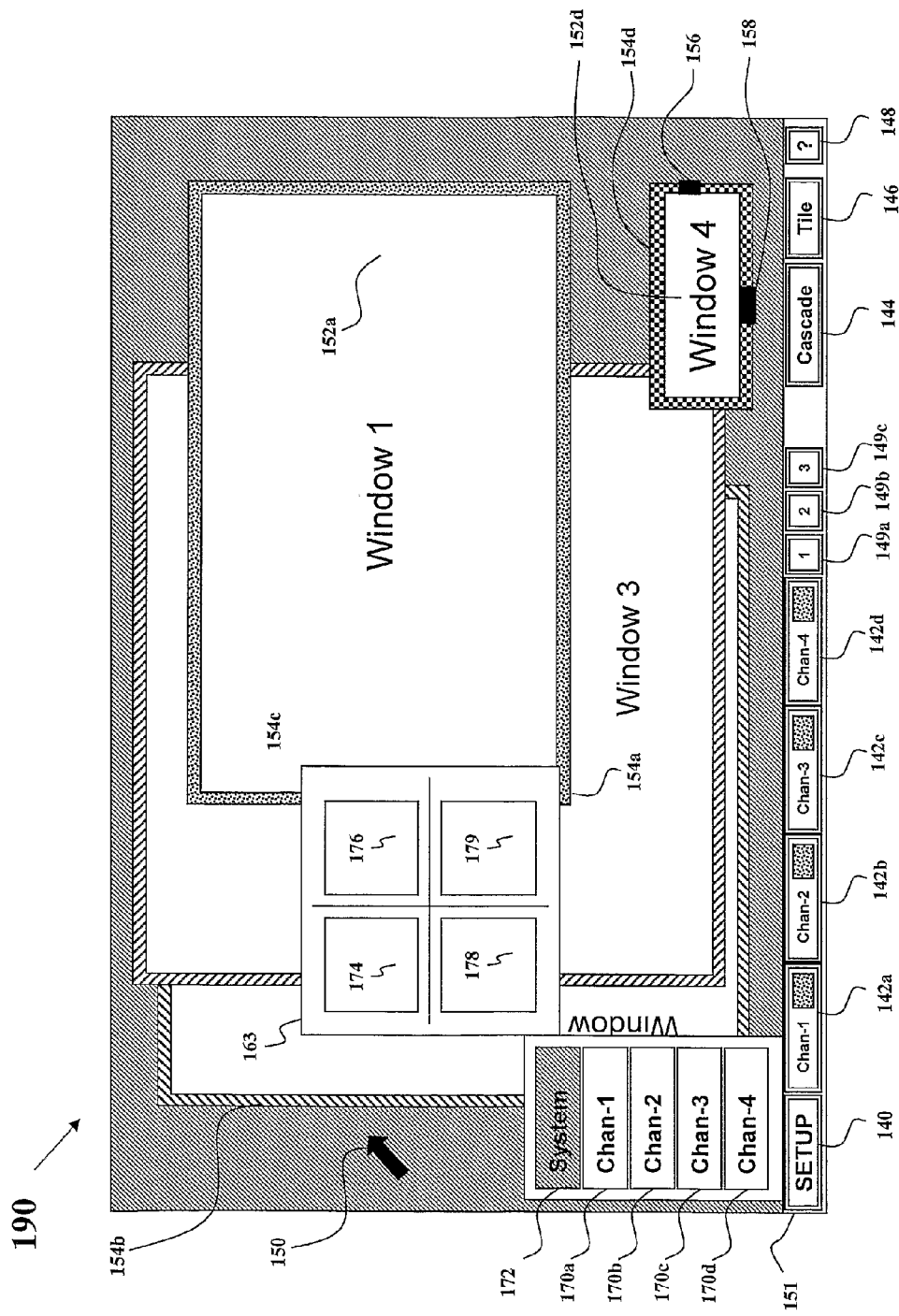
FIG. 9 illustrates a typical implementation of secured KVM combiner user display, in administrator mode, of a preferred embodiment of the present invention.

FIG. 9 illustrates an exemplary implementation of a Secured KVM Combiner user display 190 in administrator mode. This mode is accessible to authorized users through authentication means and by clicking on the SETUP key 140 located in the task-bar 151.

Setup menu will appear on top of setup key 140 to enable user selection of system option 172 or each one of the individual channels 1 to 4 through keys 170a to a70d respectively. If System key 172 is pressed another menu area 163 appears on top and present system level settings such as: frame width 176, task-bar size 179, system cursor symbol 174 and display output settings 178. This area 163 also shows various hardware parameters and loaded firmware versions.

It should be noted that display output settings may be automatically detected through display DDC interrogation by the host controller 80. This will override administrator selection at setup screen.

When selecting a specific channel key 170a to 170d, administrator may select channel color and channel input resolution.

Setup may be loaded and saved automatically by external means such as USB flash key or memory card to enable fast device setup.

Figure 10:
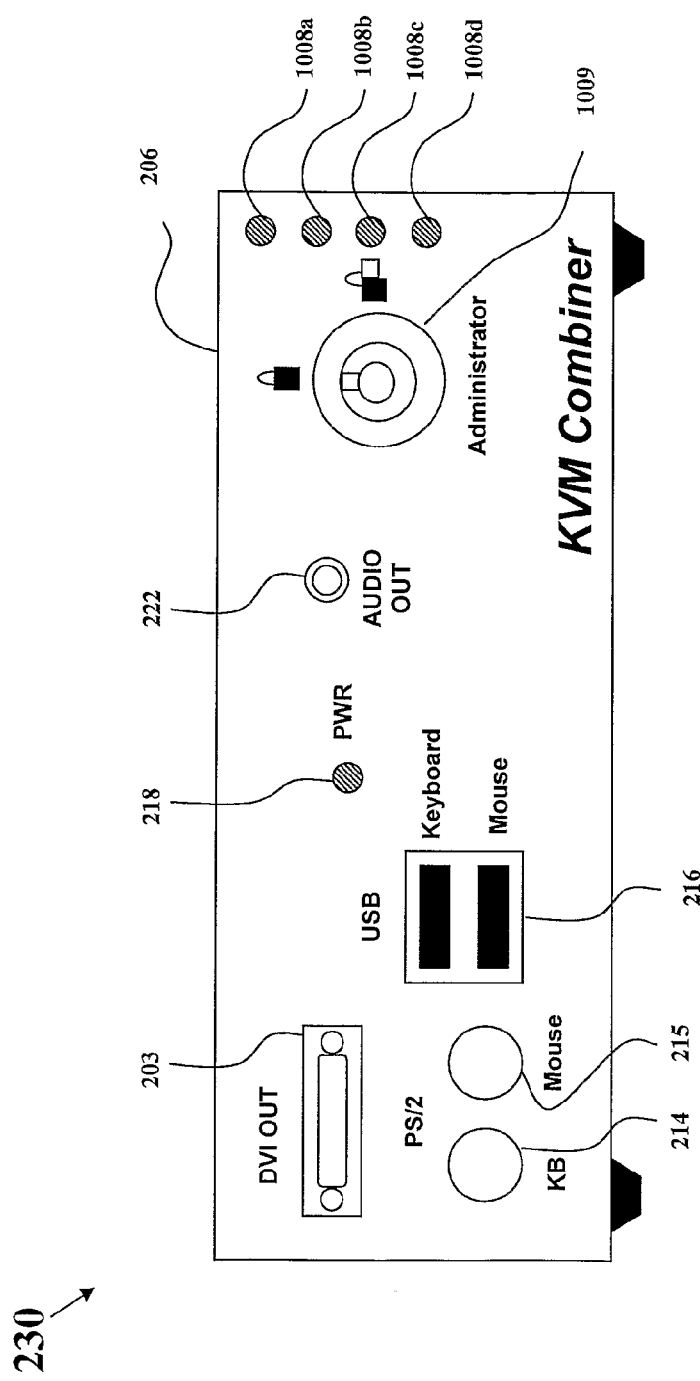
FIG. 10 illustrates typical front panel features of a secured KVM combiner with four external host computer ports of a preferred embodiment of the present invention.

FIG. 10 illustrates an exemplary front panel of a Secured KVM Combiner 230 with four external host computer ports of the present invention. This Secured KVM Combiner is similar to the Secured KVM Combiner shown in FIGS. 4, 5 and 7 above with 4 channels in this specific embodiment of the present invention. It should be noted that more or less channels may be used.

Front panel 206 is preferably having the following features:

DVI OUT Connector 203 to connect a DVI user display. Fiber-optic display interface module may be fitted on the panel to support TEMPEST requirements or remote located display installations. Other display output interfaces, or multiple display output interfaces may optionally be used.

PS/2 keyboard connector 214 to enable connection of user PS/2 keyboard.

PS/2 mouse connector 215 to enable connection of user PS/2 mouse.

Dual USB connectors 216 to enable connection of USB user mouse and keyboard.

Optional Power LED 218 to indicate that the device is powered on.

Audio out jack 222 to enable connection of user headset or speakers.

Optional channel indicators, for example LEDs 1008a to 1008d may be used for indication the status of the corresponding channel.

Optional administrator lock, for example physical lock 1009 may be used for changing the operation of the apparatus from user mode to administration or set-up mode by authorized personnel. It should be noted that other security measures prevention unauthorized tempering with the system may be employed in hardware or software.

It should be noted that more USB connectors may be used for example for multiple pointing devices. It also noted that only one of PS/2 or USB ports may be used.

It should be noted that some other feature such as Audio input jacks, power input jack and power switch may be located on the front panel.

It should be noted that some of these features and/or other feature may be located at other enclosure sides not shown here. For example the audio input jacks and main power switch may be located on the left side.

Figure 11:
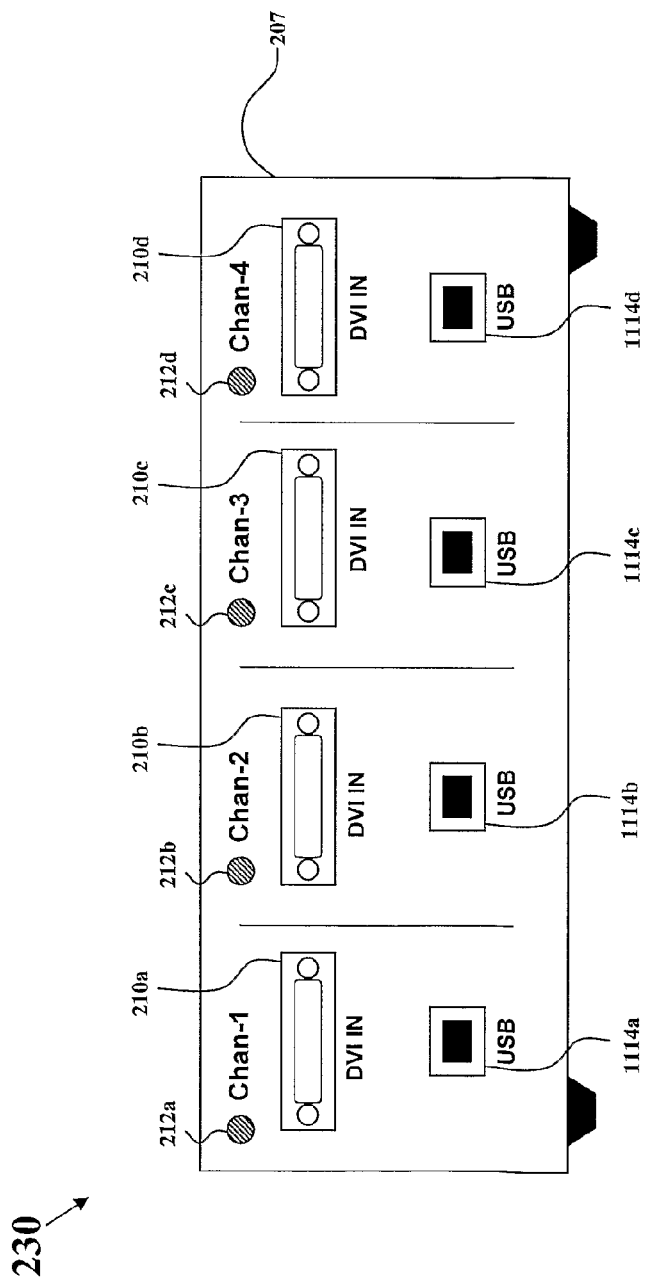
FIG. 11 illustrates typical rear panel features of a secured KVM combiner with four external host computer ports of a preferred embodiment of the present invention.

FIG. 11 illustrates an exemplary rear panel of a Secured KVM Combiner 230 with four external host computer ports according to an exemplary embodiment of the present invention. This Secured KVM Combiner is similar to the Secured KVM shown in FIGS. 4, 5 and 7 above with 4 channels in this specific embodiment of the present invention. Rear panel 207 is preferably having the following features:

USB Type-B connectors 1114a to 1114d to connect to the host computers 2a to 2d USB peripheral ports respectively.

DVI connectors 210a to 210d to connect to the host computers 2a to 2d video output ports respectively.

Optional channel selected LEDs 212a to 212d to indicate the active selected channel.

It should be noted that number of channels may be different.

It should be noted that other I/O interface standards may be used.

Figure 12:
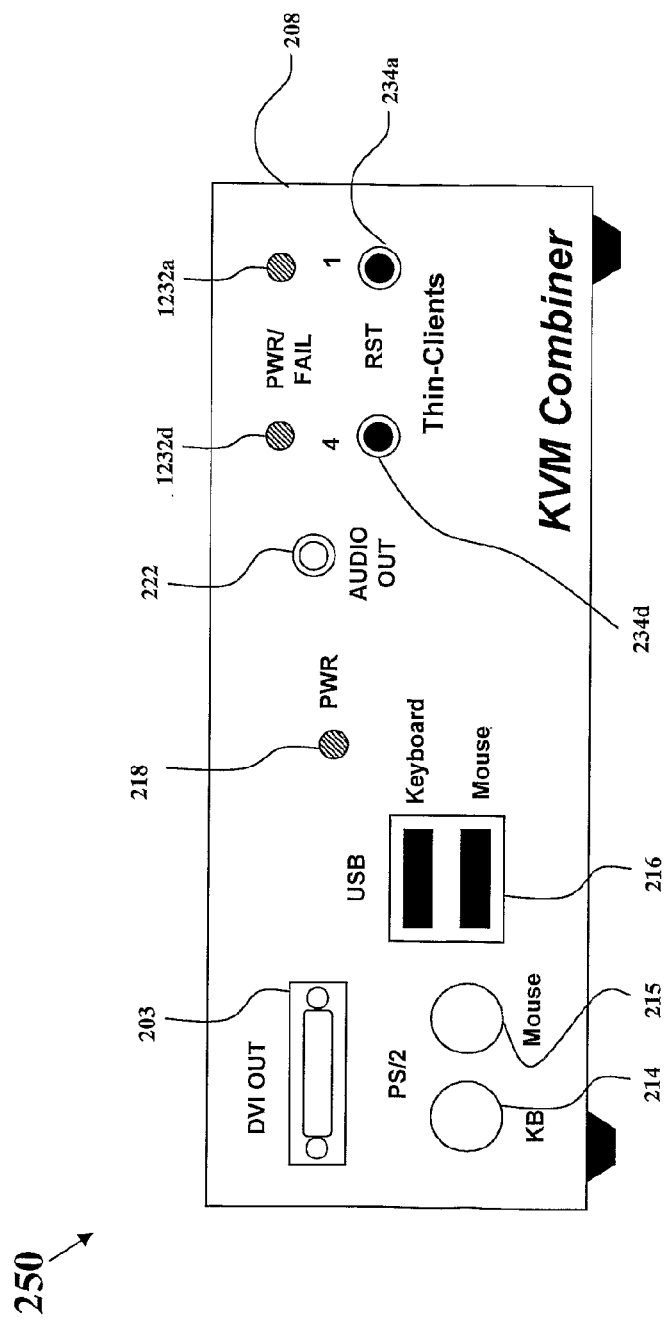
FIG. 12 illustrates typical front panel features of a secured KVM combiner with two external host computer ports and two internal thin-client modules according to yet another preferred embodiment of the present invention.

FIG. 12 illustrates an exemplary front panel of a Secured KVM Combiner 250 with two external host computer ports and two internal thin-client/computer modules of the present invention. This Secured KVM Combiner is similar to the KVM 115 shown in FIG. 6 above but with 4 channels. Front panel 208 is similar to panel 206 in FIG. 10 with the following differences:

Additional thin-client/computer Power LEDs 1232a and 1232d to indicate that the internal thin-client devices are powered on (green color) or failed in boot test (red color).

Additional thin-client/computer RESET switches 234a and 234d to allow the user to reset the internal thin-client devices.

Figure 13:
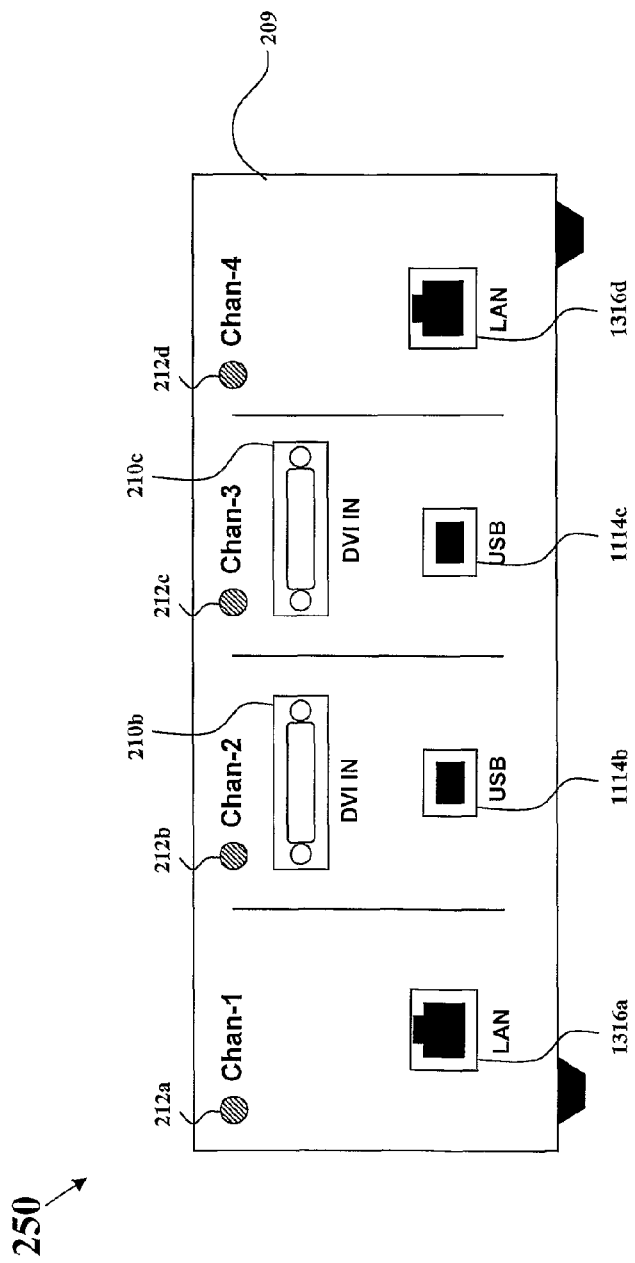
FIG. 13 illustrates typical rear panel features of a secured KVM combiner with two external host computer ports and two internal thin-client modules according to yet another preferred embodiment of the present invention.

FIG. 13 illustrates an exemplary rear panel of a Secured KVM Combiner 250 with two external host computer ports and two internal thin-client modules of the present invention. This Secured KVM Combiner is similar to the KVM 115 shown in FIG. 6 above but with 4 channels. Rear panel 209 is similar to panel 207 in FIG. 11 with the following differences:

USB Type-B connectors 1114a and 1114d replaced by LAN jack 1316a and 1316d respectively to enable LAN connection to internal thin-client modules. LAN connection may be changed to fiber-optic interface such as SFP type connector. LAN jacks 13116a and 1316d may have internal LEDs to indicate LAN Link and Activity status.

DVI connectors 210a and 210d were removed due to the internal thin-client modules at channels 1 and 4.

Figure 14:
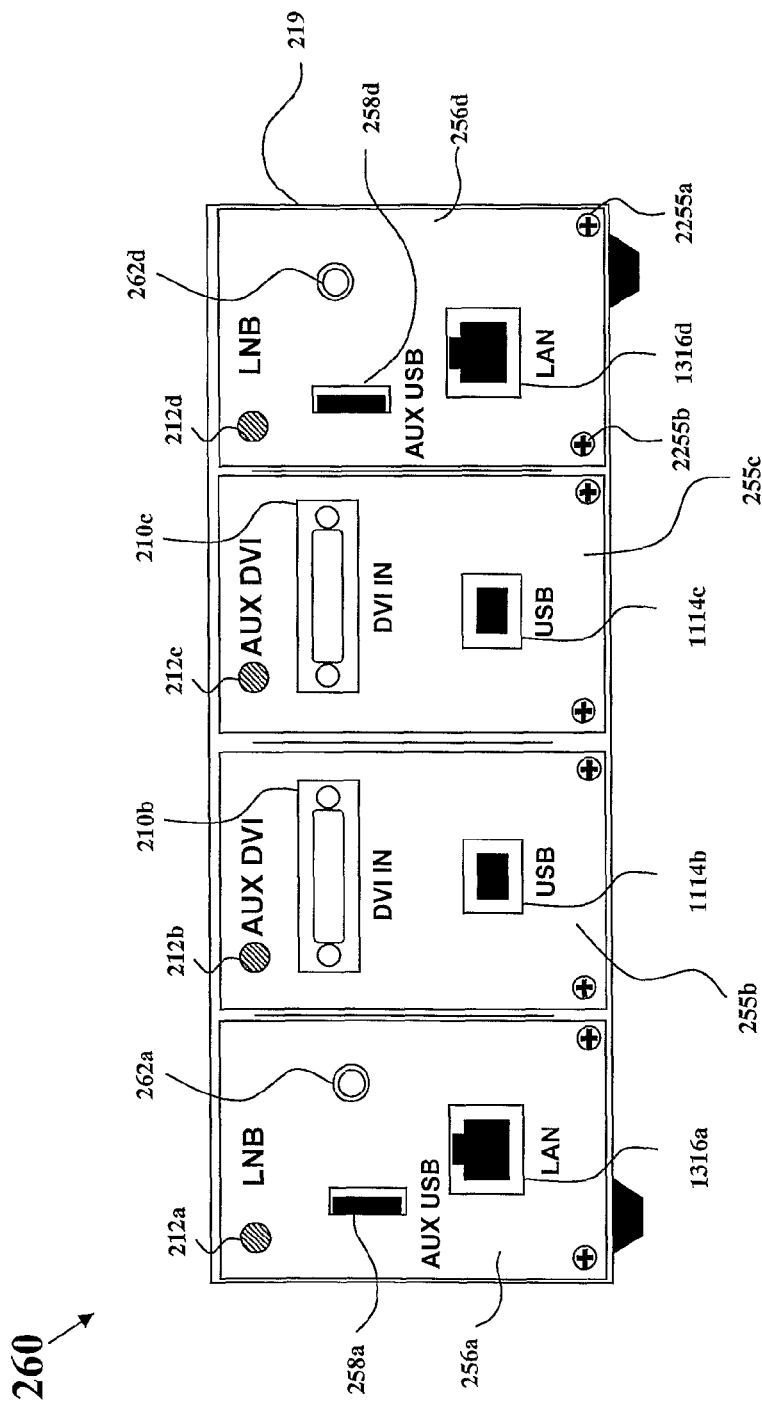
FIG. 14 illustrates a typical rear panel features of a Modular Secured KVM Combiner with two auxiliary host interface modules and two thin-client/computer modules according to yet another preferred embodiment of the present invention.

FIG. 14 illustrates a typical rear panel features of a Modular Secured KVM Combiner 260 with two auxiliary host interface modules 255b and 255c and two thin-client/computer modules 256a and 256d. This Secured KVM Combiner implementation of the present invention is similar to the KVM 116 shown in FIG. 6b above but with 4 channels. Rear panel shown is made of different modules inserted into KVM chassis 219. Modules are inserted into the chassis 219 and secured by screws or Dzus fasteners 2255a and 2255b. Technician may remove these screws to exchange modules as needed while KVM is at the user desktop.

Modularity of the KVM Combiner offers several advantages compared to non-modular KVMs:

The number and type of modules used can be customized before or after deployment to any required configuration of internal or external hosts.

Cabling can be minimized when internal hosts are used

High security organizations may want to use security policies that dedicate hosts to specific networks after initial exposure to that network. With modular device it is possible to enforce such procedure and keep operational overhead to minimum.

Product maintenance and trouble shooting is simplified compared with integrated hosts.

Thin-client computer modules 256*a* and 256*d* panels are fitted with a LAN jacks 1316*a* and 1316*d* respectively to attach the LAN, optional auxiliary USB connectors 258*a* and 258*d* respectively to attach optional user authentication device or printer and push buttons 262*a* and 262*d* respectively to reset the thin-client/computer or to enable restore to factory defaults. Optional microphone jack and other features may be added to enable further user options. LAN jack 1316*a* or 1316*d* may be substituted by fiber LAN connection if needed. LEDs 212*a* and 212*d* may indicate module selection or status.

Auxiliary host interface modules 255*b* and 255*c* panels are fitted with DVI input connectors 210*b* to enable video input from connected host. USB jack 214*b* to enable peripheral interface connection to attached host. LED 212*b* and 212*c* may indicate module selection or status.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An Isolated KVM combiner for multi-network computer system comprising:
    a keyboard input configured to connect to a keyboard;
    a pointing device input configured to connect to a pointing device;
    a host controller having an output port, a first input port and a second input port, the first and second input ports connected, respectively, to the keyboard input and the pointing device input to receive user input signals from at least one of said keyboard and said pointing device and generate unidirectional output commands based on said signals from at least one of said keyboard and said pointing device;
    at least one first peripheral interface and at least one second peripheral interface connected to at least one first host computer and at least one second host computer, respectively;
    a peripheral switch having an input connected to the output port of said host controller and at least two output ports, to selectively direct signals from said host controller only to a selected one of said at least one first peripheral interface and said at least one second peripheral interface at a time;
    at least one first physical unidirectional enforcing circuitry and at least one second physical unidirectional enforcing circuitry, each having an input port connected to the output ports of the said peripheral switch to only receive signals from said peripheral switch, and output ports connected to said at least one first peripheral interface and said at least one second peripheral interface, respectively, enforcing data flow only from said peripheral switch to the peripheral interfaces by allowing the data to flow only in one direction;
    at least one first video input interface and at least one second video input interface connected to video outputs of said at least one first host computer and said at least one second host computer, respectively;
    at least one video output port connected to a user display device;
    a digital video processor having an input connected to an output of said host controller;
    at least one first video physical unidirectional isolator and at least one second video physical unidirectional isolator, each connected to a respective input of said digital video processor and to one of said at least one first video input interface and said at least one second video input interface, respectively, enforcing data flow only from said at least one first video input interface and said at least one second video input interface, respectively, to said video processor by allowing the data to flow only in one direction,
    wherein said digital video processor is configured to combine video signals received from said at least one first video input interface and said at least one second video input interface through said at least one first and second video physical unidirectional isolator, respectively, to obtain a composite video signal and outputting said composite video signal to said at least one video output port, and
    wherein said video processor receives said unidirectional output commands generated by said host controller in response to said user input signals received from at least one of said keyboard input and said pointing device input, whereby absolute data isolation is maintained between the first and second host computers.

2. The Isolated KVM combiner of claim 1, wherein the at least one first host computer and the at least one second host computer are connected to at least two separate networks, respectively.

3. The Isolated KVM combiner of claim 1, wherein said peripheral switch is responsive to commands received from at least one of said keyboard input and said pointing device input.

4. The Isolated KVM combiner of claim 1, wherein said composite video signal to be displayed on the user display device comprises at least one first window and at least one second window, wherein video content of said at least one first window is derived from video signal from said at least one first video input interfaces, and video content of said at least one second window is derived from video signal from said at least one second video input interfaces.

5. The Isolated KVM combiner of claim 4 wherein only one of said at least one first window and said at least one second window is an active window, and the video content of said active window is derived from video signal from video input interface of the host computer coupled to the peripheral interface selected by said peripheral switch.

6. The Isolated KVM combiner of claim 1, further comprising a video frame buffer connected to said video processor.

7. The Isolated KVM combiner of claim 1, and having at least one video input interface connected to an external video source other than a computer.

8. The Isolated KVM combiner of claim 1, further comprising at least one first non-volatile memory and at least one second non-volatile memory connected to said at least one first video input interface and at least one second video input interface, respectively, wherein said at least one first non-volatile memory and said at least one second non-volatile memory contain display parameters readable by said at least one first host computer and said at least one second host computer, respectively.

9. The Isolated KVM combiner of claim 8, wherein said display parameters are readable to the respective host to emulate standard display DDC (Display Data Channel).

10. The Isolated KVM combiner of claim 8, wherein upon connection of the isolated KVM combiner to one or more of the first or second host computers, the host computer video circuitry interrogates said at least one first non-volatile memory and said at least one second non-volatile memory to receive Plug & Play parameters.

11. The Isolated KVM combiner of claim 10, wherein said Plug 86 Play parameters are selected from the group consisting: display name, supported display resolution, and supported display refresh rate.

12. The Isolated KVM combiner of claim 8, wherein said at least one first non-volatile memory and said at least one second non-volatile memory are user programmable.

13. The isolated KVM device of claim 1, further comprising:

at least one first audio interface and at least one second audio interface, respectively connected to one of said at least one first host computer and at least one second host computer; and an audio multiplexer, wherein said audio multiplexer is connected to said at least one first audio interface and said at least one second audio interface and to at least one audio peripheral selected from a group consisting of: microphone, headset, and a speaker.

14. The isolated KVM device of claim 1, further comprising a cascading port to enable the isolated KVM device to be cascaded to another isolated KVM device.

15. The Isolated KVM combiner of claim 1, wherein said video processor comprises an FPGA (Field Programmable Gate Array).

16. The Isolated KVM combiner of claim 1, wherein said video physical unidirectional isolators comprise a 1-Way DVI Interface.

17. The Isolated KVM combiner of claim 1, wherein said host controller transmits said unidirectional output command to said video processor through unidirectional flow device.

18. The Isolated KVM combiner of claim 1, wherein said unidirectional output commands to said video processor are generated by said host controller in response to user input from said pointing device.

19. The Isolated KVM combiner of claim 1, wherein said unidirectional output commands to said video processor are generated by said host controller in response to special keyboard keys combination.

* * * * *